United States Patent [19]
You

[11] Patent Number: 6,092,776
[45] Date of Patent: Jul. 25, 2000

[54] MULTI-PURPOSE HOLDER, HAVING A RECESS WITH AN OPEN CIRCULAR UPPER END, A RECTANGULAR MIDDLE PORTION AND A FUNNEL SHAPED CAVITY LOWER END

[76] Inventor: Bae-Jou You, No. 63, Alley 90, 1 Lane, Sec. 6, Lu Ho Road, Ho Mei Cheng, Chang Hua Hsien, Taiwan

[21] Appl. No.: 09/343,557

[22] Filed: Jun. 30, 1999

[51] Int. Cl.$^7$ ...................................................... A47K 1/08
[52] U.S. Cl. .......................................... 248/311.2; 108/44
[58] Field of Search ................................ 248/311.2, 314; 224/926; 108/44; 297/188.16, 188.17

[56] References Cited

U.S. PATENT DOCUMENTS 5,390,608  2/1995  Mclaren et al. ........................... 108/44
5,628,486  5/1997  Rossman et al. ...................... 248/311.2

*Primary Examiner*—Ramon O. Ramirez
*Attorney, Agent, or Firm*—Birch, Stewart, Kolasch & Birch, LLP

[57] ABSTRACT

A multi purpose holder includes a holder frame and at least one clamping unit. The clamping unit is provided at a rear end of the holder frame and adapted to secure the holder frame on an object. The holder frame is provided with at least one recess that has a circular upper end adapted to receive an object like a cup, a middle portion configured to be a rectangular portion adapted to insertably receive an object like a cellular phone, and a lower end configured to be a substantially funnel-shaped cavity adapted to insertably receive an umbrella and collect raindrops dripped from the umbrella.

4 Claims, 5 Drawing Sheets

6,092,776

MULTI-PURPOSE HOLDER, HAVING A RECESS WITH AN OPEN CIRCULAR UPPER END, A RECTANGULAR MIDDLE PORTION AND A FUNNEL SHAPED CAVITY LOWER END

BACKGROUND OF THE INVENTION (a) Field of the Invention

The present invention relates to a multi-purpose holder, more particularly to a holder that can be adapted for holding cups, cellular phones, and umbrellas, and that is adapted to clamp any suitable object in a car.

(b) Description of the Prior Art

There are many types of holders adapted for use in cars to hold cups or drinks. But there is not any multi-purpose holder that can hold cups, cellular phones, or umbrellas. Cellular phones are very popular nowadays, but cars in general are not equipped with a cellular phone holder. Besides, putting wet umbrellas inside the car is a problem. Although there are umbrellas provided with a telescopic jacket to prevent a wet umbrella from wetting the surroundings, they are relatively bulky.

SUMMARY OF THE INVENTION

A primary object of the present invention is to provide a multi-purpose holder that can hold cups, cellular phones and umbrellas.

According to a first aspect of the present invention, a multi-purpose holder includes a holder frame and at least one clamping unit. The clamping unit is provided at a rear end of the holder frame and adapted to secure the holder frame on an object. The holder frame is provided with at least one recess that has a circular upper end adapted to receive an object like a cup, a middle portion configured to be a rectangular portion adapted to insertably receive an object like a cellular phone, and a lower end configured to be a substantially funnel-shaped cavity adapted to insertably receive an umbrella and collect raindrops dripped from the umbrella.

According to a second aspect of the present invention, the clamping unit includes a securing seat, a movable clamp plate, a spring, a spring plate, and an axial pin. The securing seat has a lower end provided with holes for receiving rivets or bolts that secure the securing seat to corresponding holes of the holder frame. The securing seat has an upper end that bends outwardly and is provided with lugs on both sides of a rear end thereof, the lugs having opposed axial holes. The movable clamp plate is provided with opposed lugs having axial holes. The movable clamp plate is coupled with the securing seat by means of the axial pin such that the movable clamp plate can pivotally turn using the axial pin as pivot. The spring is sleeved over and secured on the axial pin. Resetting force of the spring enables a rear end of the movable clamp plate to maintain a clamping force directed to said securing seat. The spring plate has one end secured on an inner side of the rear end of the movable clamp plate, with the other end extending upwardly and towards the securing seat to form a bent portion such that the clamping unit can utilize the rear end of the movable clamp plate and the bent portion of the spring plate to clamp an object at two points. In this way, a stable clamping force can be achieved to keep the securing seat in a vertical manner so that the holder frame is kept relatively horizontal.

According to a third aspect of the present invention, the holder frame has a bottom portion provided with an L-shaped spring plate that has an upper end provided with holes and secured to one side of the holder frame by means of rivets such that a bottom portion of the L-shaped spring plate is substantially parallel to that of the holder frame to allow the holder to be insertably clamped at an edge of a foot pedal pad inside a car.

According to a fourth aspect of the present invention, the upper end of the L-shaped spring plate is provided with two barb-shaped protrusions, and the holder frame is provided with a suitably deep groove in one side thereof for insertion of the upper end of the L-shaped spring plate such that the L-shaped spring plate can secure integrally with the holder frame by means of the protrusions that can engageably be retained in the groove.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
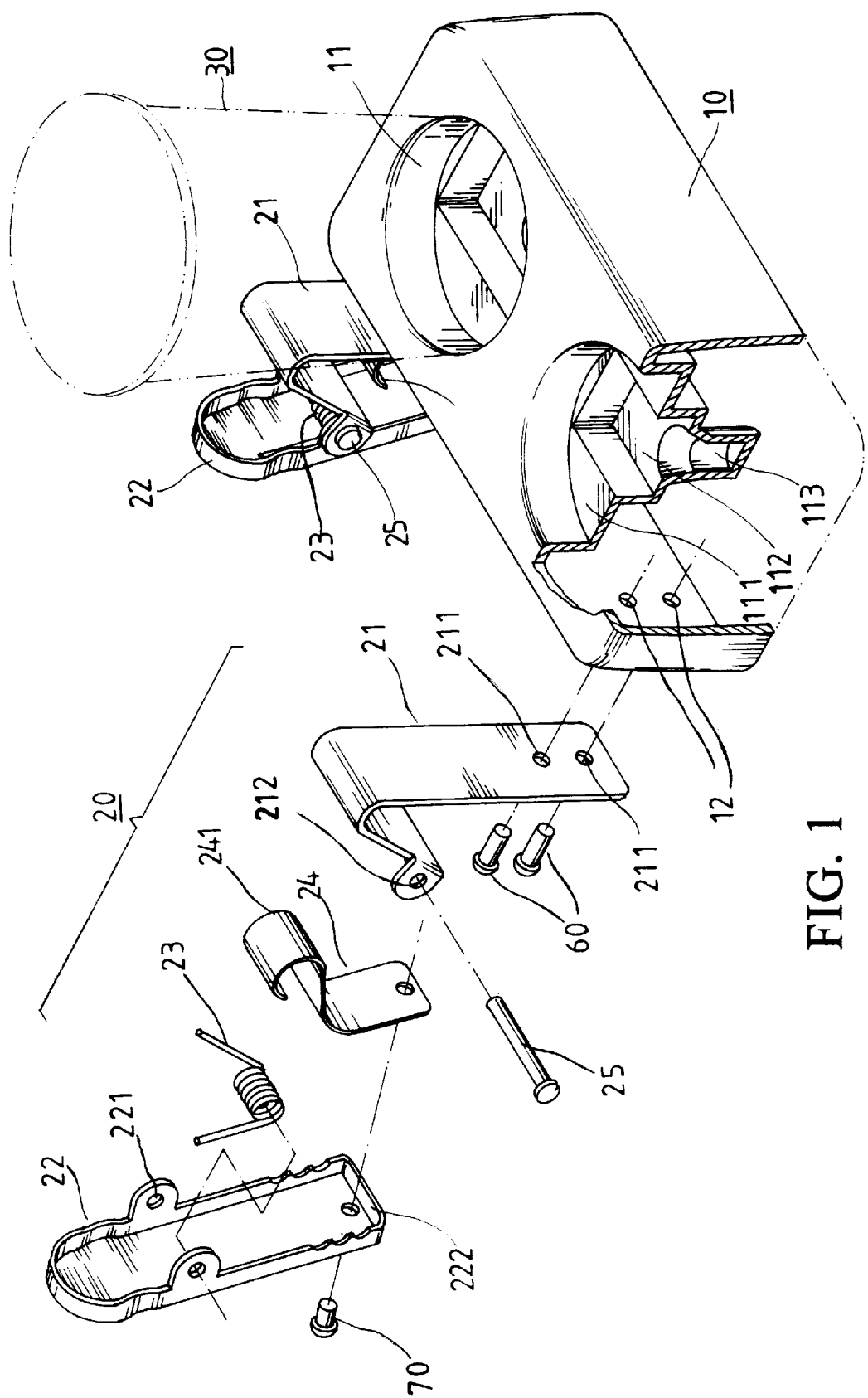
FIG. 1 is an exploded perspective view of a preferred embodiment of the multi-purpose holder of the present invention.
Figure 2:
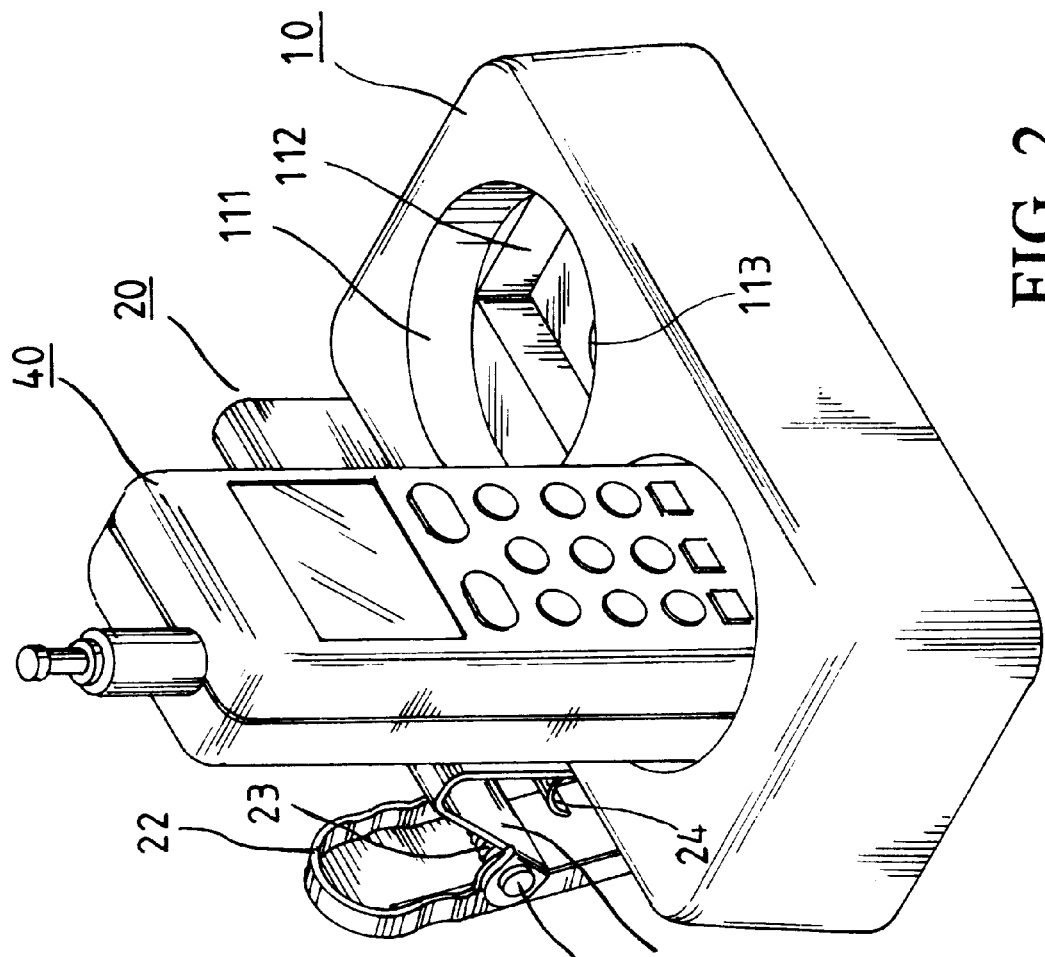
FIG. 2 is an assembled perspective view of the preferred embodiment.
Figure 3:
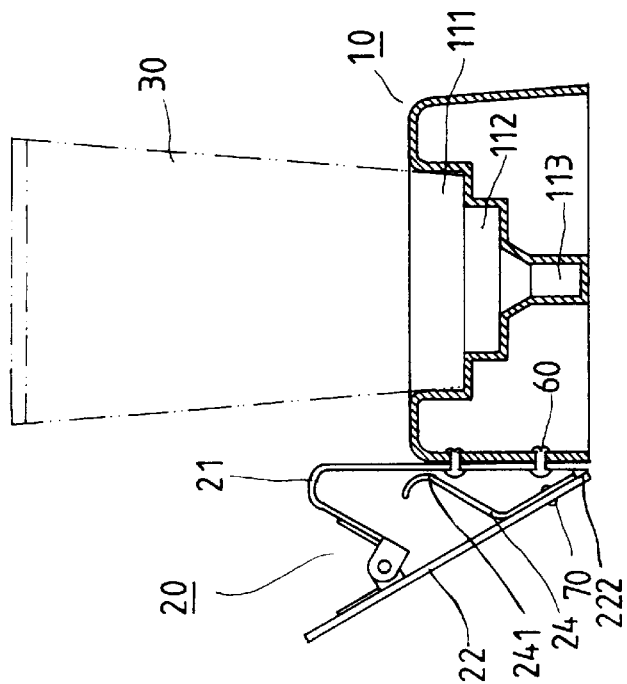
FIG. 3 is a sectional schematic view of the preferred embodiment.
Figure 4:
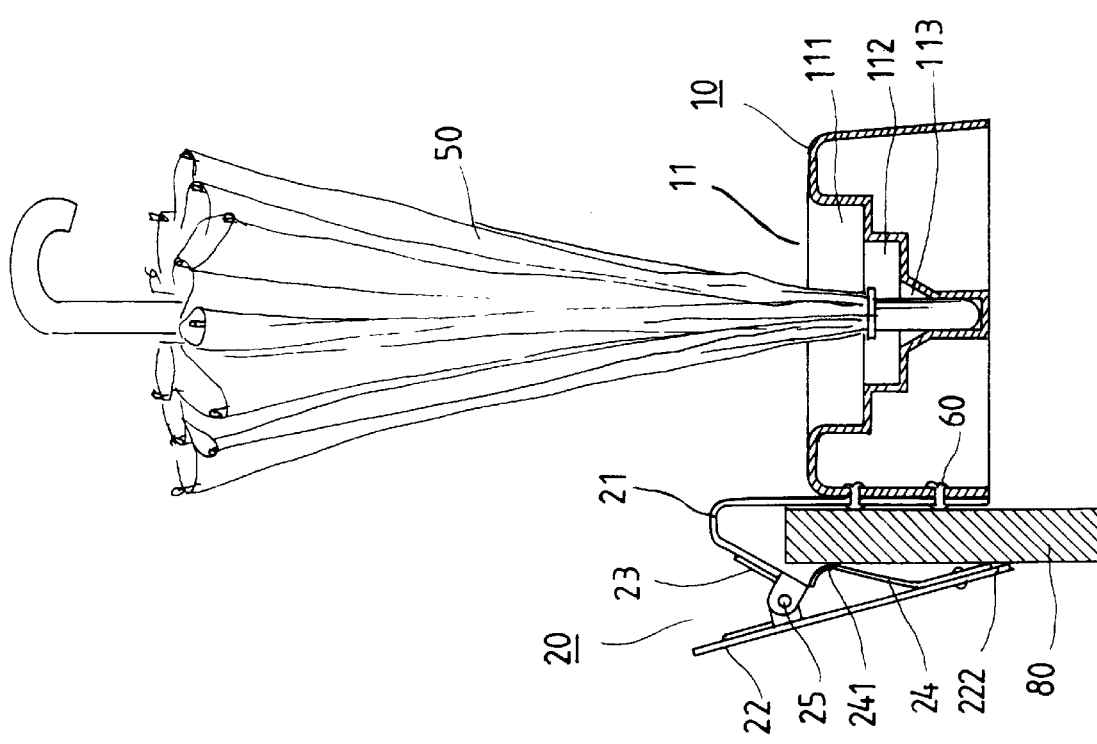
FIG. 4 is a sectional schematic view showing the preferred embodiment clamping an object.

With reference to FIGS. 1 and 2, a multi-purpose holder of the present invention is shown to include a holder frame 10 and clamping units 20. The clamping units 20 are provided at a rear end of the holder frame 10 and adapted to secure the holder frame 10 on an object. The present invention is characterized in that the holder frame 10 is provided with at least one recess 11 that has a circular upper end 111 adapted to receive an object like a cup 30 in FIG. 3. A middle portion of the recess 11 is configured to be a rectangular portion 112 adapted to insertably receive an object like a cellular phone 40 in FIG. 2. A lower end of the recess 11 is configured to be a substantially funnel-shaped cavity 113 adapted to insertably receive an umbrella 50 and collect raindrops dripped from the umbrella 50, as shown in FIG. 4. It can therefore be appreciated that the holder of the present invention can hold various kinds of objects.

The clamping unit 20 in generally includes a securing seat 21, a movable clamp plate 22, a spring 23, a spring plate 24, and an axial pin 25. The securing seat 21 has a lower end provided with holes 211 for receiving rivets 60 that secure the securing seat 21 to corresponding holes 12 of the holder frame 10. An upper end of the securing seat 21 bends outwardly and is provided with lugs on both sides of a rear end thereof, the lugs having opposed axial holes 211. The movable clamp plate 22 is likewise provided with opposed lugs having axial holes 221. The axial pin 25 is used to couple the movable clamp plate 22 with the securing seat 21 integrally by passing through the corresponding axial holes 221, 211 such that the movable clamp plate 22 can pivotally turn using the axial pin 25 as pivot. The spring 23 is sleeved over the axial pin 25. By means of the resetting force of the spring 23, a rear end 222 of the movable clamp plate 22 can maintain a clamping force directed to the securing seat 21. The spring plate 24 has one end secured on an inner side of the rear end 222 of the movable clamp plate 22 by means of a rivet 70, with the other end extending upwardly and towards the securing seat 21 to form a bent portion 241 such that the clamping unit 20 can utilize the rear end 222 of the movable clamp plate 22 and the bent portion 241 of the s spring plate 24 to clamp an object 80 at two points (see FIG. 4). Therefore, a stable clamping force can be achieved to keep the securing seat 21 in a vertical manner so that the holder frame 10 is kept relatively horizontal.

Figure 6:
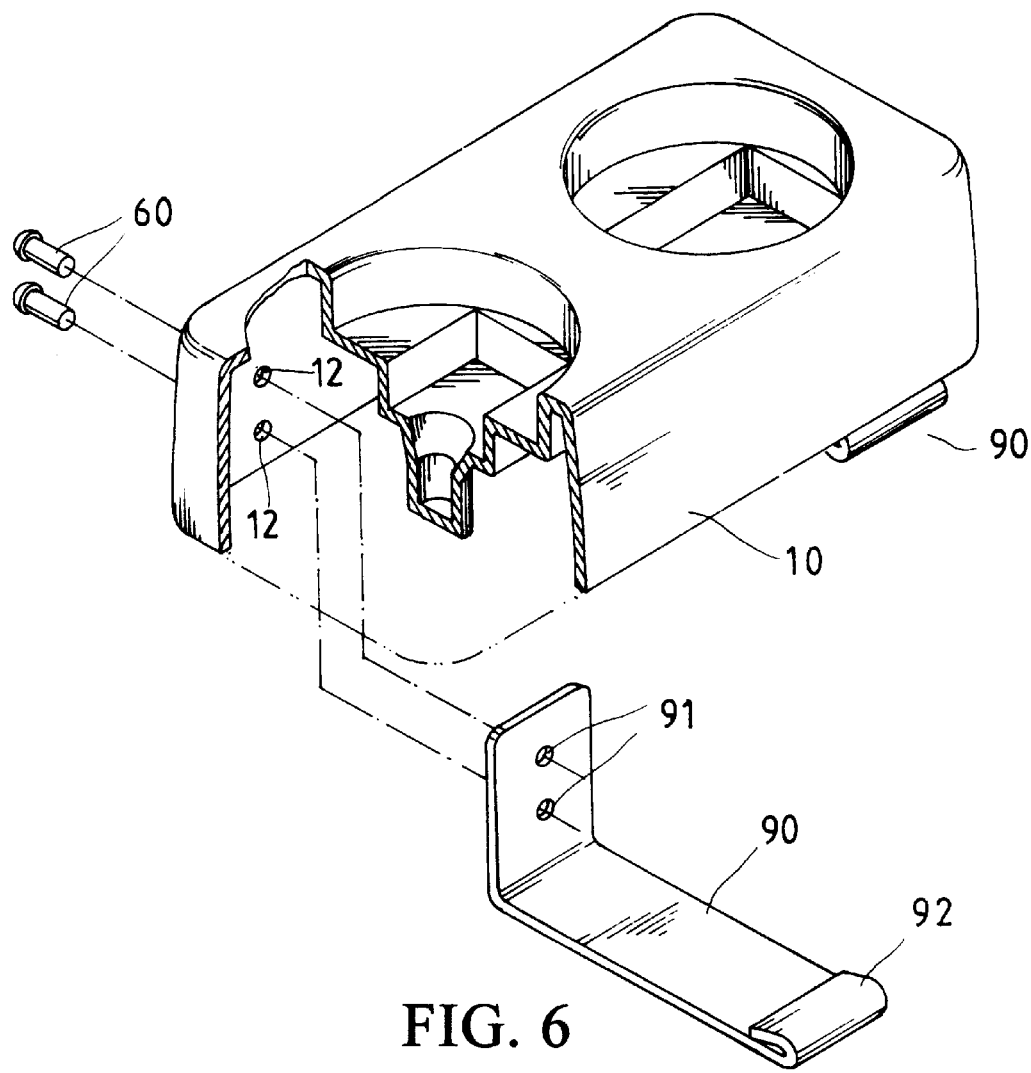
FIG. 6 is an exploded perspective view of a further preferred embodiment of the present invention.
Figure 7:
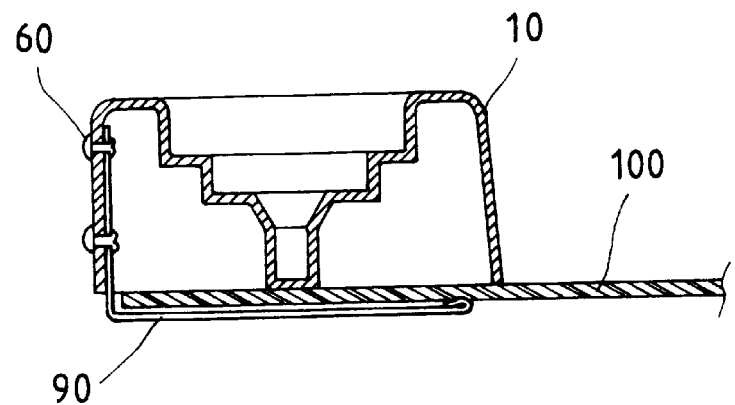
FIG. 7 is a sectional schematic view of the further preferred embodiment.

Referring to FIGS. 6 and 7, the holder frame 10 has a bottom portion provided with a spring plate 90 that is substantially L-shaped. An upper end of the spring plate 90 is provided with holes 91 and is secured to one side of the holder frame 10 by means of rivets 60. A lower end of the spring plate 90 is substantially horizontal and has a rear end provided with a bent portion 92. In other words, the bottom portion of the spring plate 90 is substantially parallel to that of the holder frame 10 so that the holder as a whole can be insertably clamped at an edge of a foot pedal pad inside a car and secured in position.

Figure 8:
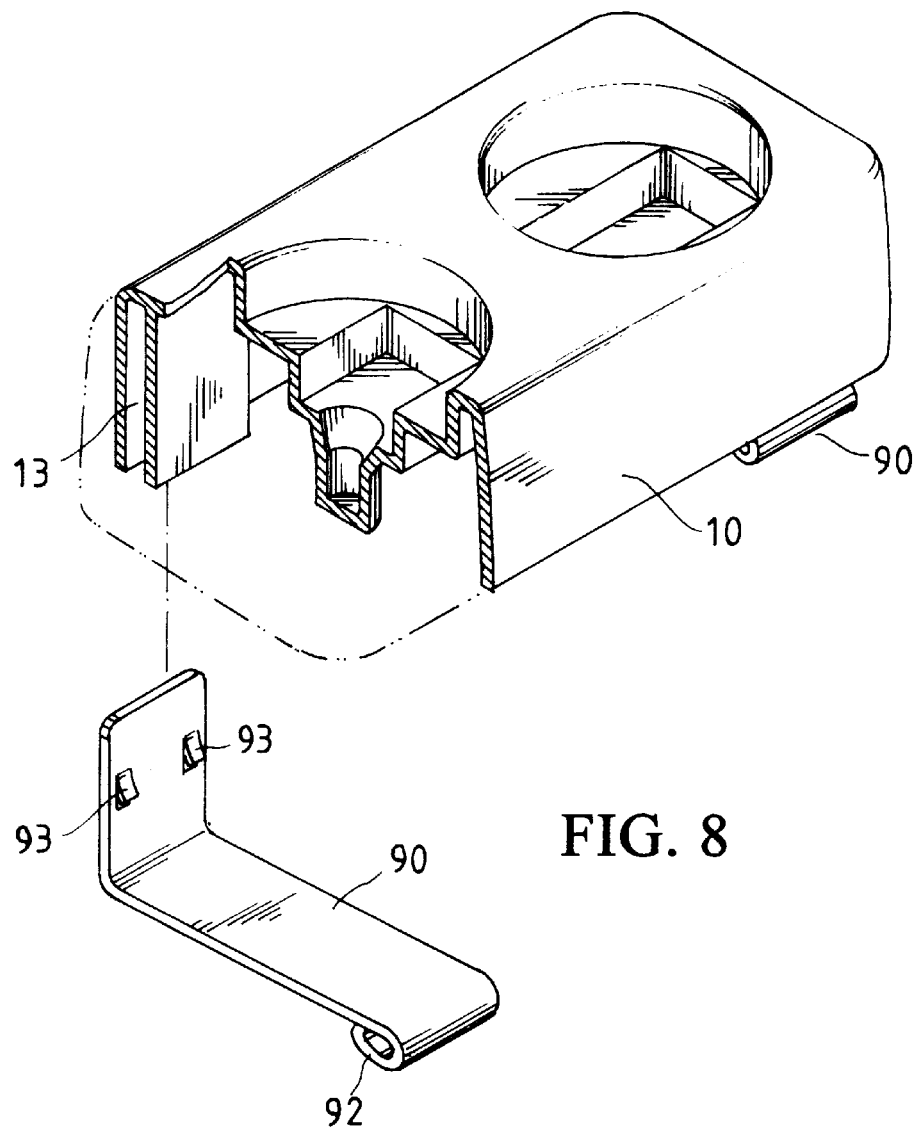
FIG. 8 is an exploded perspective view of still another preferred embodiment of the present invention.
Figure 9:
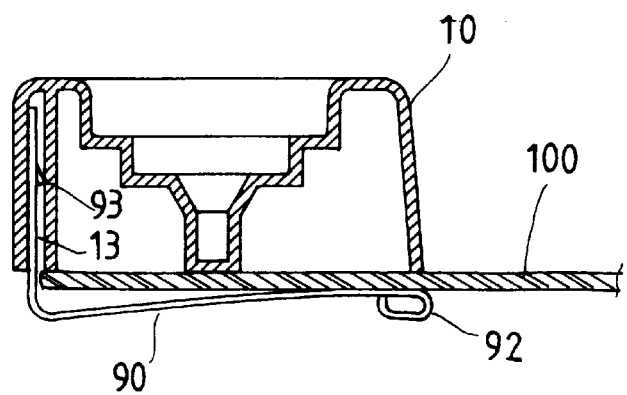
FIG. 9 is a sectional schematic view of the still another preferred embodiment.

FIGS. 8 and 9 show another embodiment of the L-shaped spring plate 90. In this embodiment, the upper end of the spring plate 90 is provided with two barb-shaped protrusions 93, and the holder frame 10 is provided with a suitably deep groove 13 in one side thereof for insertion of the upper end of the spring plate 90 such that the protrusions 93 can be engageably retained in the groove 13. In this embodiment, although use of rivets 60 is eliminated, the spring plate 90 can still be secured to the holder frame 10 as a whole.

Figure 5:
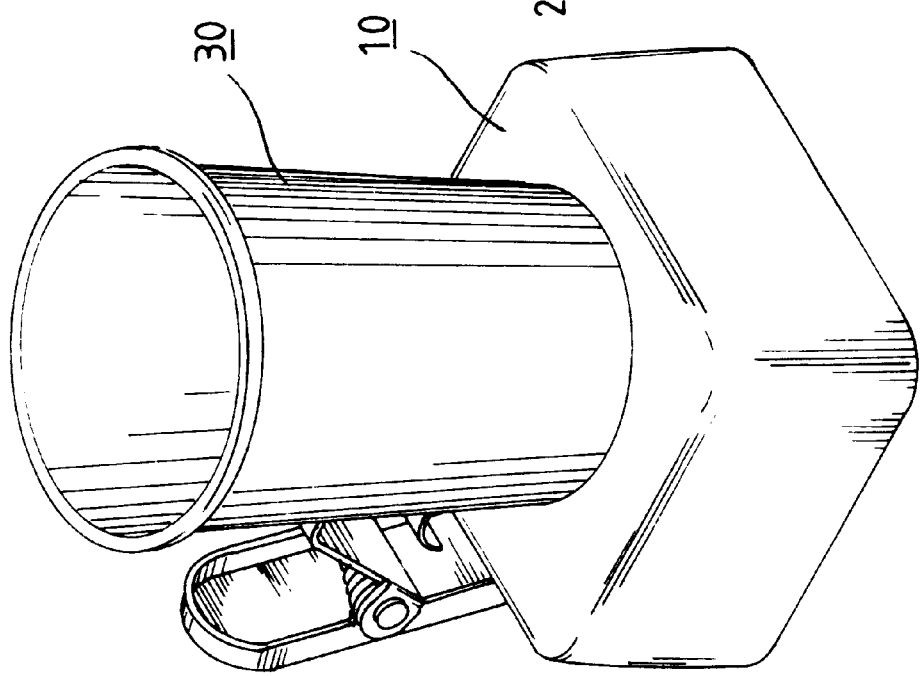
FIG. 5 is a perspective view of another preferred embodiment of the present invention

In the present invention, as the upper end of the securing seat 21 bends and extends outwardly to quite a distance, the clamping unit 20 can be opened to a considerable extent so that the thickness of the object clamped can vary, which means that the holder of the present invention can clamp various objects inside the car to facilitate use. Furthermore, the holder frame 10 may be provided with two recesses 11, or only a single recess 11 as shown in FIG. 5. Certainly, the holder frame 10 may also be provided with more than two recesses. Likewise, the number of clamping units 20 used can also vary according to requirements.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-purpose holder, comprising a holder frame and at least one clamping unit, said clamping unit being provided at a rear end of said holder frame and adapted to secure said holder frame on an object, wherein said holder frame is provided with at least one recess that has a circular upper end adapted to receive an object like a cup, a middle portion configured to be a rectangular portion adapted to insertably receive an object like a cellular phone, and a lower end configured to be a substantially funnel-shaped cavity adapted to insertably receive an umbrella and collect raindrops dripped from said umbrella.

2. A multi-purpose holder as defined in claim 1, wherein said clamping unit includes a securing seat, a movable clamp plate, a spring, a spring plate, and an axial pin, said securing seat having a lower end provided with holes for receiving rivets or bolts that secure said securing seat to corresponding holes of said holder frame, said securing seat having an upper end that bends outwardly and is provided with lugs on both sides of a rear end thereof, said lugs having opposed axial holes, said movable clamp plate being provided with opposed lugs having axial holes, said movable clamp plate being coupled with said securing seat by means of said axial pin such that said movable clamp plate can pivotally turn using said axial pin as pivot, said spring being sleeved over and secured on said axial pin, resetting force of said spring enabling a rear end of said movable clamp plate to maintain a clamping force directed to said securing seat, said spring plate having one end secured on an inner side of said rear end of said movable clamp plate, with the other end extending upwardly and towards said securing seat to form a bent portion such that said clamping unit can utilize said rear end of said movable clamp plate and said bent portion of said spring plate to clamp an object at two points, thereby achieving a stable clamping force to keep said securing seat in a vertical manner so that said holder frame is kept relatively horizontal.

3. A multi-purpose holder as defined in claim 1, wherein said holder frame has a bottom portion provided with an L-shaped spring plate that has an upper end provided with holes and secured to one side of said holder frame by means of rivets such that a bottom portion of said L-shaped spring plate is substantially parallel to that of said holder frame to allow said holder to be insertably clamped at an edge of a foot pedal pad inside a car.

4. A multi-purpose holder as defined in claim 3, wherein said upper end of said L-shaped spring plate is provided with two barb-shaped protrusions, and said holder frame is provided with a suitably deep groove in one side thereof for insertion of said upper end of said L-shaped spring plate such that said L-shaped spring plate can secure integrally with said holder frame by means of said protrusions that can engageably be retained in said groove.

* * * * *